United States Patent

[11] 3,624,518

[72] Inventors Clell A. Dildy, Jr.
Panama City, Fla.;
The United States of America as represented by the Secretary of the Navy
[21] Appl. No. 22,267
[22] Filed Mar. 24, 1970
[45] Patented Nov. 30, 1971

[54] SINGLE PULSE SWITCH CIRCUIT
10 Claims, 7 Drawing Figs.

[52] U.S. Cl. .......... 328/63, 307/208, 307/215, 307/218, 307/221, 307/247 A, 307/269, 328/92
[51] Int. Cl. .......... H03k 1/00, H03k 3/12
[50] Field of Search .......... 328/62, 63, 57, 92; 307/208, 221, 215, 218, 247, 247 A, 269

[56] References Cited
UNITED STATES PATENTS

| | | | |
|---|---|---|---|
| 3,510,783 | 5/1970 | Smith | 307/269 X |
| 3,508,079 | 4/1970 | Moll et al. | 307/247 A |
| 3,504,200 | 3/1970 | Avellar | 307/269 |
| 3,471,789 | 10/1969 | Nutting et al. | 328/63 |
| 3,193,697 | 7/1965 | Cogar et al. | 307/269 X |

*Primary Examiner*—Stanley D. Miller, Jr.
*Attorneys*—Richard S. Sciascia, Don D. Doty and William T. Skeer

ABSTRACT: A logical switching circuit is disclosed which produces a single, noise-free output pulse of one clock pulse duration in response to a noisy input data signal and a predetermined clock signal. It incorporates signal sources, effectively connected to flip-flops or complement signal generators, shift registers shifted by timely provided clock pulses, and AND-gate coincidence circuits, all of which are serially connected.

INVENTOR.
Clell A. Dildy, Jr.
BY
Don D. Doty
Attorney

Clell A. Dildy, Jr.
INVENTOR.

BY

Dox D. Doty
Attorney

INVENTOR.
Clell A. Dildy, Jr.
BY
Dox D. Doty
Attorney

SINGLE PULSE SWITCH CIRCUIT

STATEMENT OF GOVERNMENT INTEREST

The invention described herein may be manufactured and used by or for the Government of the United States of America for governmental purposes without the payment of any royalties thereon or therefor.

FIELD OF INVENTION

The present invention relates, in general, to electronic switching systems and, in particular, is a very simple but effective switching circuit for controlling the operation of a digital system. In even greater particularity, it is a switching logic circuit for timely providing a high-fidelity, noiseless pulse of predetermined duration in response to either the closing of an electrical switch having mechanical contacts or to an electrical analog type of signal having predetermined amplitude characteristics.

DESCRIPTION OF THE PRIOR ART

In electronic data processing systems, it is not uncommon to use mechanically actuated electrical switches in combination with other electrical or electronic circuits, and, in many instances, the bouncing of the contacts thereof cause noise and numerous other adverse effects to occur therein. Moreover, it is well known to produce a single output pulse that is synchronized with a predetermined clock pulse by means of electromechanical switches that are associated with monostable multivibrators, flip-flops, clock generators, and the like. In addition, in some instances, whenever such prior art circuits were required to supply noise-free output pulses, additional complex customized noise signal filters containing capacitors and resistors were needed, too. As a result, such prior art circuits not only left something to be desired from a functional standpoint, in that they caused unduly large time delays, they were also bulky, unwieldy, noisy, relatively expensive to manufacture, and did not readily lend themselves to being constructed as chips or integrated circuits. Hence, when incorporated in contemporary electronic devices, such prior art switching circuits adversely affected the construction and use thereof.

SUMMARY OF THE INVENTION

The instant invention overcomes most of the disadvantages of the aforementioned prior art, inasmuch as it is a logical switching circuit which provides a single, noise-free output pulse per clock pulse upon receipt of an input signal from a contact bouncing switch or in response to an electrical signal having predetermined voltage rise characteristics, either of which may include spurious noise characteristics.

It is, therefore, an object of this invention to provide an improved synchronized single pulse logical switching circuit.

Another object of this invention is to provide an improved manual input signal to a digital system.

Still another object of this invention is to provide an improved method and means for producing a single, noise-free electrical pulse of one clock period duration in response to a predetermined electrical input signal.

A further object of this invention is to provide an improved method and means for producing a clock-synchronized, single, noise-free, electrical output pulse of one clock period duration in response to a predetermined mechanical input signal.

A further object of this invention is to provide an improved method and means for producing a single, noise-free output pulse of one clock period duration in response to the closing of an electromechanical switch having electrical contacts, the closing of which effect unwanted noise signals in the output thereof due to the occurrence of transient currents therebetween.

Another object of this invention is to provide an improved switching circuit for supplying timely synchronized analog input signals to various and sundry compatible digital systems.

Still another object of this invention is to provide an improved operating-actuated, start-stop, logical switching system for remotely or otherwise controlling high-speed item-handling apparatus, digital data link apparatus, navigation data link apparatus, steering deviation indicator systems, and the like.

Another object of this invention is to provide an improved analog to digital converter.

Still another object of this invention is to provide an improved method and means for driving electronic digital logic circuits with noiseless input signals, so as to effect more accurate output signals therefrom.

Still another object of this invention is to provide an improved method and means for effectively eliminating the electrical transfer noise from electrical switch contacts.

Another object of this invention is to provide a single pulse-switching circuit which may be manufactured by means of chip construction or integrated circuit construction.

A further object of this invention is to provide a synchronized single-pulse switch circuit which is simple in construction and, therefore, is easily and economically manufactured, maintained, and operated.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
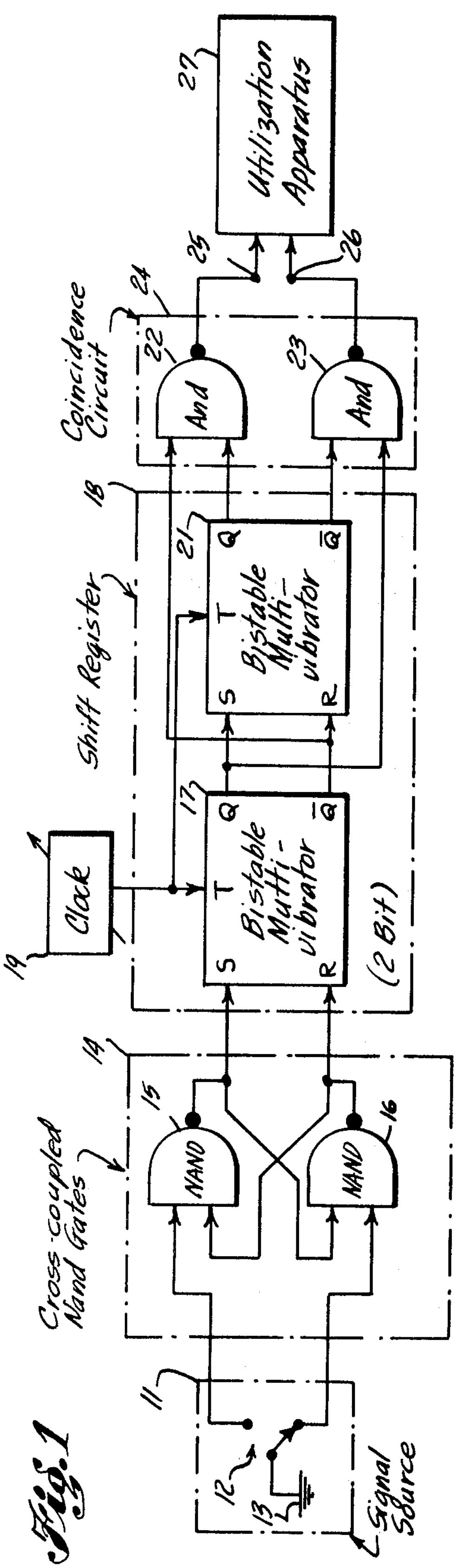
FIG. 1 is a block diagram of a preferred embodiment of the subject invention.

Referring now to FIG. 1, there is shown a signal source 11 having a single-pole double-throw switch 12, the movable arm of which is connected to a ground 13, the two electrical contacts of which are connected to a pair of compatible inputs of a cross-couple NAND-gate type of flip-flop 14.

As may readily be seen, flip-flop 14 includes a pair of NAND-gates 15 and 16, each of which has a pair of inputs and an output. One of the inputs of NAND-gate 15 is connected to one of the aforementioned electrical contacts of switch 12, and the other input to NAND-gate 15 is connected to the output of the aforesaid NAND-gate 16. The output of NAND-gate 15 is connected to one of the inputs of NAND-gate 16, and the other input to NAND-gate 16 is connected to the remaining electrical contact of switch 12 located in signal source 11.

The outputs of NAND-gates 15 and 16 are connected to the set (S) and reset (R) inputs of a bistable multivibrator 17 located within shift register 18—herein exemplarily represented as a two-bit shift register. The shift timing input (T) of bistable multivibrator 17 is connected to the output of a variable clock pulse generator 19, and the Q and $\bar{Q}$ outputs thereof are respectively connected to the set (S) and reset (R) inputs of another bistable multivibrator 21. The shift timing input T of bistable multivibrator 21 is likewise connected to the output of the aforesaid clock 19.

In this particular instance, only two bistable multivibrators are incorporated in shift register 18 because it is desired that it only be a two-bit register; however, it should be understood that any number of bistable multivibrator stages may be incorporated in shift register 18, in the event that more than two bits are decided to be stored in the register during any given operational circumstances.

The Q and $\bar{Q}$ outputs of bistable multivibrator 21 are connected respectively to one of the inputs of each of a pair of AND-gates 22 and 23 located in a coincidence circuit 24, and the other inputs to said AND-gates 22 and 23 are respectively connected to the $\bar{Q}$ output and the Q output of the aforesaid bistable multivibrator 17. The outputs of AND-gates 22 and 23 are respectively connected to a pair of output terminals 25 and 26, which, in actuality, constitute the outputs of this preferred embodiment of the subject invention.

As previously mentioned during the summarization of the subject invention, many devices are suitable for being connected to the output of the invention. Accordingly, to not belabor the discussion thereof further, it will merely be stated that any compatible predetermined utilization apparatus 27 may be connected to the output thereof for any operational purposes.

Figure 2:
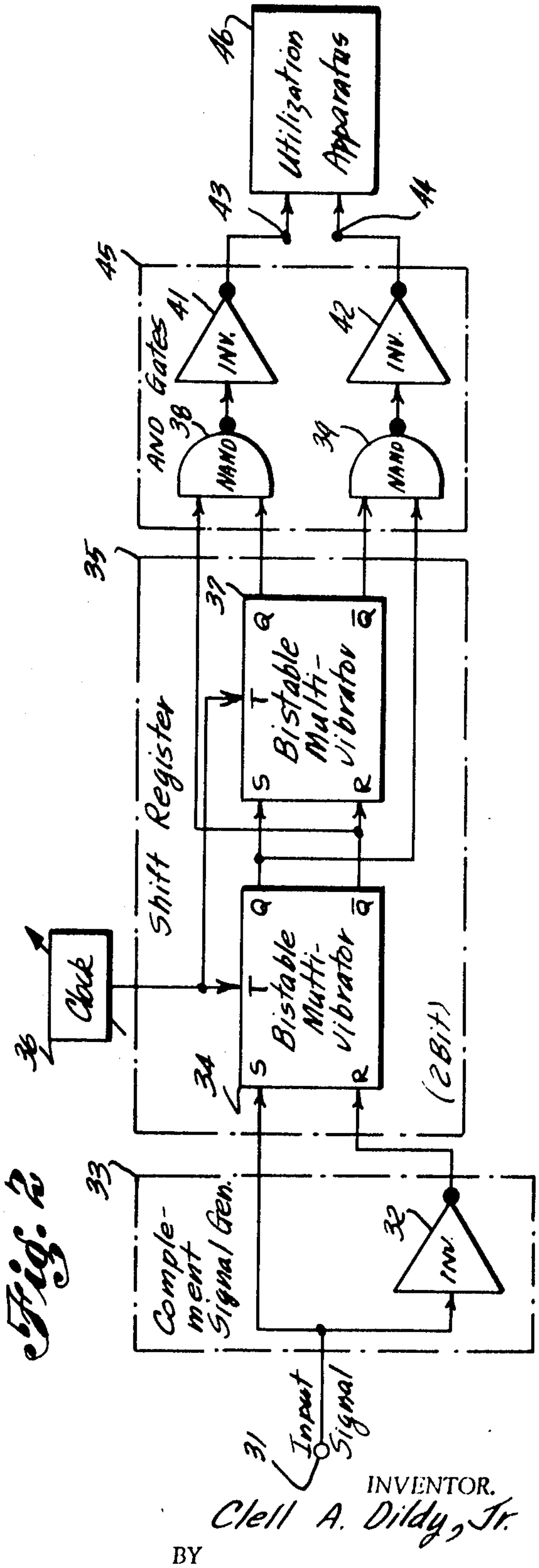
FIG. 2 is a block diagram of another species which constitutes another preferred embodiment of the subject invention.

Referring now to FIG. 2 there is shown an input terminal 31 which is connected to the input of an inverter 32, which when combined with the input signal from terminal 31 constitutes a complement signal generator 33. Hence, the aforesaid input terminal 31 and the output of inverter 32 are connected to the set (S) and reset (R) inputs, respectively, of a bistable multivibrator 34 of a shift register 35. The shift timing input (T) of bistable multivibrator 34 is connected to the output of a variable clock 36 and the Q and $\bar{Q}$ outputs thereof are respectively connected to the set (S) and reset (R) inputs of another bistable multivibrator 37. Of course, the shift timing input (T) of bistable multivibrator 37 is likewise connected to the output of the aforesaid clock 36 and, in addition, it may readily be seen that bistable multivibrator 37 is likewise a part of shift register 35. Again, it should be noted that shift register 35 is herein described as being a two-bit shift register; however, in the event that operational circumstances so warrant, it may be designed to have any number of bistable multivibrators or bit storage stages.

The Q and $\bar{Q}$ outputs of bistable multivibrator 37 are respectively connected to one of the inputs of each of a pair of NAND-gates 38 and 39, and the other inputs to NAND-gates 38 and 39 are respectively connected to the $\bar{Q}$ and Q outputs of the aforementioned bistable multivibrator 34. The outputs of NAND-gates 38 and 39 are respectively connected to the inputs of inverters 41 and 42, the outputs of which are respectively connected to a pair of output terminals 43 and 44. Of course, as readily may be seen, in this particular preferred embodiment, the aforementioned NAND-gate 38 and inverter 41 and the aforesaid NAND-gate 39 and inverter 42 respectively constitute combinations which operationally effect a pair of AND-gates 45.

The output terminals 43 and 44 of inverters 41 and 42 constitute the outputs of the invention, as it is portrayed in FIG. 2, and, as such, they are adapted for being connected to the inputs of any appropriate compatible utilization apparatus 46.

Figure 3:
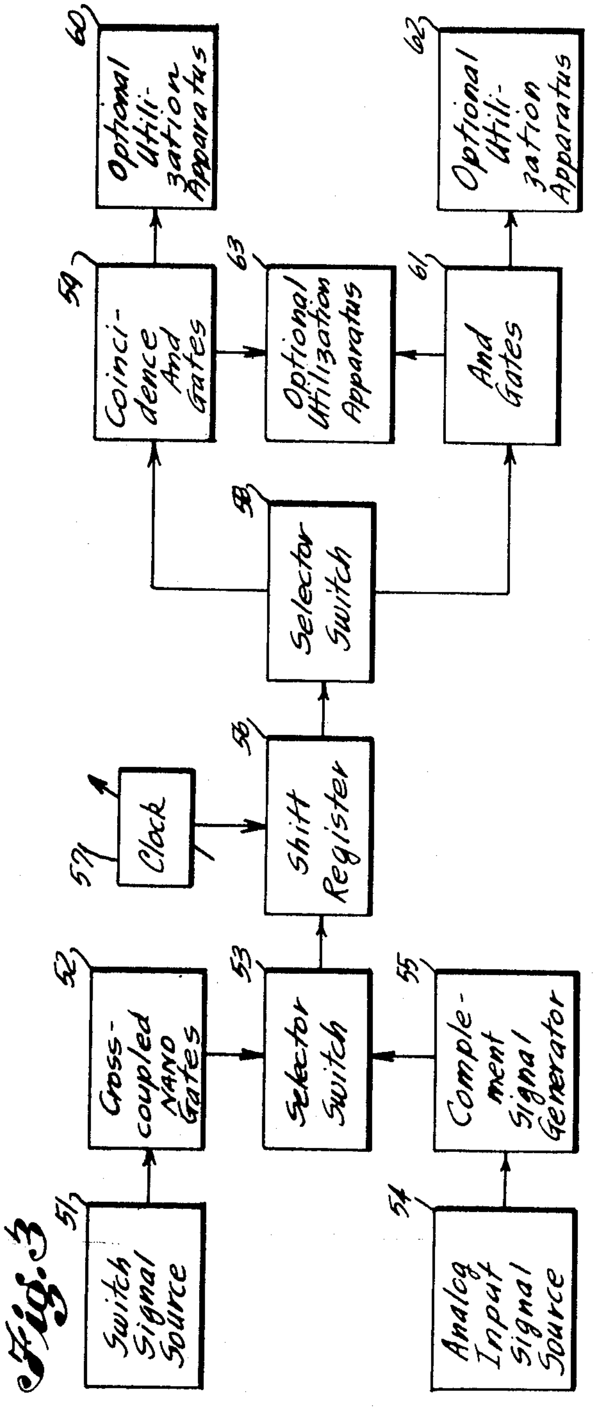
FIG. 3 is a block diagram of still another preferred embodiment of the subject invention which uniquely combines the aforesaid preferred embodiments depicted in FIGS. 1 and 2.

Referring now to FIG. 3, there is depicted a unique combination of the device of FIGS. 1 and 2. There is shown a switch-type signal source 51, with the output thereof connected to cross-coupled NAND-gates 52, which, in turn, has its output connected to one of the inputs of a selector circuit 53. An analog input signal source 54 of any suitable type has its output connected to the input of a complement signal generator 55 which, in turn, has its output connected to the other input of the aforesaid selector switch 53. The output of selector switch 53 is connected to the input of a shift register 56 having whatever number of stages that would be necessary for any given operational circumstances designed therein. A clock 57, which may be varied in accordance with the frequency of the signal desired therefrom, has its output connected to the shift input of shift register 56. The output of shift register 56 is connected to the input of another selector switch 58.

At this time, it should perhaps be mentioned that selector switches 53 and 58 may be so designed as to give any desired switching commutations and permutations necessary to obtain the results desired from this embodiment of the subject invention. Likewise, it should be understood that, although it is not so shown in FIG. 3 of the drawing, in order to prevent such limitations thereto, selector switches 53 and 58 may be ganged together as necessary to perform the switching operations in any preferred synchronized commutations and permutations or concomitantly, as desired.

Selector switch 58 has a pair of outputs, one of which is connected to coincidence gates 59, the output of which may be connected to an optional utilization apparatus 60. The other output of selector switch 58 is connected to the input of AND-gates 61, the output of which may be connected to an optional utilization apparatus 62.

As may readily be seen in this particular arrangement optional utilization apparatus 60 and 62 are respectively connected to the outputs of coincidence AND-gates 59 and AND-gates 61 when it is desired that two separate utilization apparatus be actuated by the subject invention, and especially when said two separate utilization apparatus may be somewhat different in structure and operation. However, it should also be noted that outputs of coincidence AND-gates 59 and AND-gates 61 may also be connected to the inputs of a single optional utilization apparatus 63, the operation of which requires input signals of such nature as are effected by gates 59 and 61.

Again, the aforementioned utilization apparatus 60, 62, and 63 may be any that would be compatible with respect to the outputs of coincidence AND-gates 59 and AND-gates 61 for any desired operational purposes, and, accordingly, because they are operationally so connected, it may readily be seen that any one or more of the outputs of said gates 59 and 61 may constitute the output of the preferred embodiment of the subject invention depicted in FIG. 3.

Figure 4:
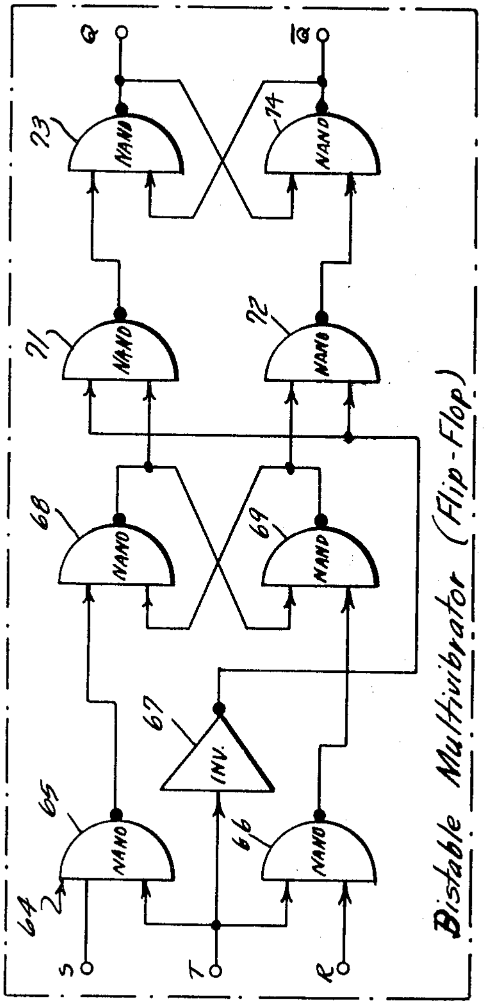
FIG. 4 is a logical diagram which depicts an exemplary bistable multivibrator (flip-flop) that may be used as any of the bistable multivibrators incorporated in the embodiments of the subject invention illustrated in FIGS. 1, 2, and 3.

Referring now to FIG. 4, there is shown a trio of input terminals which respectively constitute the set (S), shift timing (T), and reset (R) input terminals to a bistable multivibrator 64 which, as previously indicated, may be used as any of the bistable multivibrators incorporated in the devices of FIGS. 1 through 3.

The set input terminal (S) is connected to one of the inputs of a NAND-gate 65, and the shift-timing input terminal (T) is connected to the other input thereof, as well as to one of the inputs of another NAND-gate 66. The other input to NAND-gate 66 is connected to the aforesaid reset terminal (R). The shift-timing input terminal (T) is likewise connected to the input of an inverter 67. The outputs of NAND-gates 65 and 66 are respectively connected to one of the inputs of each of a pair of NAND-gates 68 and 69, with the output of NAND-gate 68 connected to the other input of NAND-gate 69, and with the output of NAND-gate 69 connected to the other input of NAND-gate 68. The outputs of NAND-gates 68 and 69 are also respectively connected to one of the inputs of each of a pair of NAND-gates 71 and 72, with the other inputs thereof each interconnected and connected to the output of the aforesaid inverter 67. The outputs of NAND-gates 71 and 72 are respectively connected to one of the inputs of each of a pair of NAND-gates 73 and 74, with the output of NAND-gate 73 connected to the other input of NAND-gate 74, and with the output of NAND-gate 74 connected to the other input of NAND-gate 73. The outputs of NAND-gates 73 and 74 respectively constitute the outputs of bistable multivibrators 64 and, hence, are respectively connected to the Q output terminal and $\bar{Q}$ terminal thereof.

Figure 5:
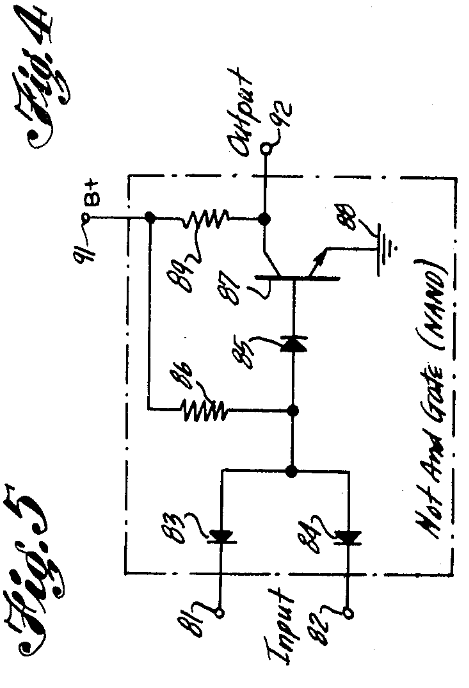
FIG. 5 is a schematic diagram of exemplary not-AND gates (NAND) which may be used as any of the not-AND gates incorporated in the devices of FIGS. 1, 2, and 3.

As previously mentioned, FIG. 5 discloses a preferred embodiment of a not-AND gate (NAND) which may be incorporated as any of the NAND gates used in the device of FIGS. 1 through 3. It is shown as having a pair of input terminals 81 and 82 which are respectively connected to the cathodes of a pair of diodes 83 and 84, the anodes of which are interconnected and connected to the anode of another diode 85, as well as to one of the terminals of a resistance 86. The cathode of diode 85 is connected to the base of an NPN-transistor 87, the emitter of which is connected directly to a ground 88 and the collector of which is connected to one terminal of a resistor 89. The other terminals of resistors 86 and 89 are interconnected and connected to a predetermined direct current B+ voltage 91. The collector of the aforesaid NPN-transistor 87 is likewise connected to an output terminal 92 which, of course, constitutes the output of the entire NAND gate.

MODE OF OPERATION

The operation of the instant invention will now be discussed briefly in conjunction with all of the figures of the drawing.

Considering first the operation of the device of FIG. 1, it may be seen that two input signals are required for the invention to function properly. One is a clock signal, ideally represented by the waveform of FIG. 6(A), and the other is a switch-initiated signal, which occurs as a result of manually or otherwise manipulating the movable arm of switch 12.

Although switch 12 obviously has two contact positions, the operation effected by using only one—that is, the one where the movable arm is moved for contact with the upper electrical contact—will be discussed here, since using the other contact would merely effect the reverse operation. Hence, moving the switch arm to the upper contact generates a data signal of the type shown exemplarily in FIG. 6(B), and this then becomes the operative input data signal to one of the inputs of NAND-gate 15 of flip-flop 14. When this data signal is supplied to NAND-gate 15, both of the inputs thereof effectively become grounded, thereby causing the output signal thereof to become Plus relative to ground. This Plus output signal is, at that time, supplied to an input of NAND-gate 16; and since the other input thereof is likewise Plus because switch 12 is open with respect thereto, the output of NAND-gate 16 becomes Minus with respect to ground. Of course, this condition continues to exist until the upper contact of switch 12 is opened, and at that time, the outputs of NAND-gates 15 and 16 revert to their original voltage levels. Hence, during the period of time switch 12 is closed, signals having the waveforms of FIGS. 6(C) and 6(D) are produced at the outputs of NAND-gates 15 and 16, respectively, and, thus, they are also produced at the outputs of cross-coupled NAND-gate flip-flop 14.

The signals of FIGS. 6(C) and (D) are respectively supplied to the set (S) and reset (R) inputs of bistable multivibrator 17. They are stored therein as a result of its state being changed by the immediately following input of the trailing edge of the clock pulse to the shift input (T) thereof, and they remain stored therein until the trailing edge of the clock pulse immediately following the trailing edges of the waveforms of FIGS. 6(C) and (D) occurs. Therefore, such operations effect output signals at the Q and $\bar{Q}$ outputs of bistable multivibrator 17 which have waveforms similar to those shown in FIGS. 6(E) and 6(F), respectively.

The signals of FIGS. 6(E) and 6(F) are respectively supplied to the set (S) and reset (R) inputs of bistable multivibrator 21, as well as to one of the inputs of each of AND-gates 22 and 23 of coincidence circuit 24, the operation of which will be discussed shortly.

Upon the input of the immediately following trailing edge of the clock pulse to shift timing input T of bistable multivibrator 21, it shifts or changes state and, thus, acquires the waveforms of FIGS. 6(G) and 6(H) at the Q and $\bar{Q}$ outputs thereof, respectively. And, of course, when trailing edges of the signals of FIGS. 6(E) and 6(F) occurs, bistable multivibrator 21 changes back to its original state upon receipt of an immediately following trailing edge of a clock pulse, thereby completing its Q and $\bar{Q}$ output signals, as again shown in FIGS. 6(G) and 6(H).

As a result of AND-gate 23 receiving its input signals from the Q output of bistable multivibrator 17 and the $\bar{Q}$ output of bistable multivibrator 21, it is enabled when the signal of FIG. 6(E) becomes more positive (because at that time two similar inputs are being simultaneously applied thereto) and it is disabled when the signal of FIG. 6(H) becomes more negative. Therefore, a signal similar to that shown in FIG. 6(I) is produced at the output thereof and, thus, at output terminal 26, too. Of course, AND-gate 22 operates in an identical manner as AND-gate 23 but the timing is different because the inputs are reversed. Hence, the output signal from AND-gate 22 and output terminal 25 has the waveform of FIG. 6(J).

When either or both of the signals depicted in FIG. 6(I) or FIG. 6(J) are supplied to utilization apparatus 27 they contain no deleterious spurious noises as a result of contact bounce and transient currents having occurred in switch 12 during the closing and opening thereof. Accordingly, utilization apparatus 27 is triggered or actuated by clean, high-fidelity, accurately timed pulses, each of which has a duration of only one clock period. And, of course, should said utilization apparatus be a digital system, the accuracy thereof is vastly improved, as a result of being actuated by such signals.

Figure 7:
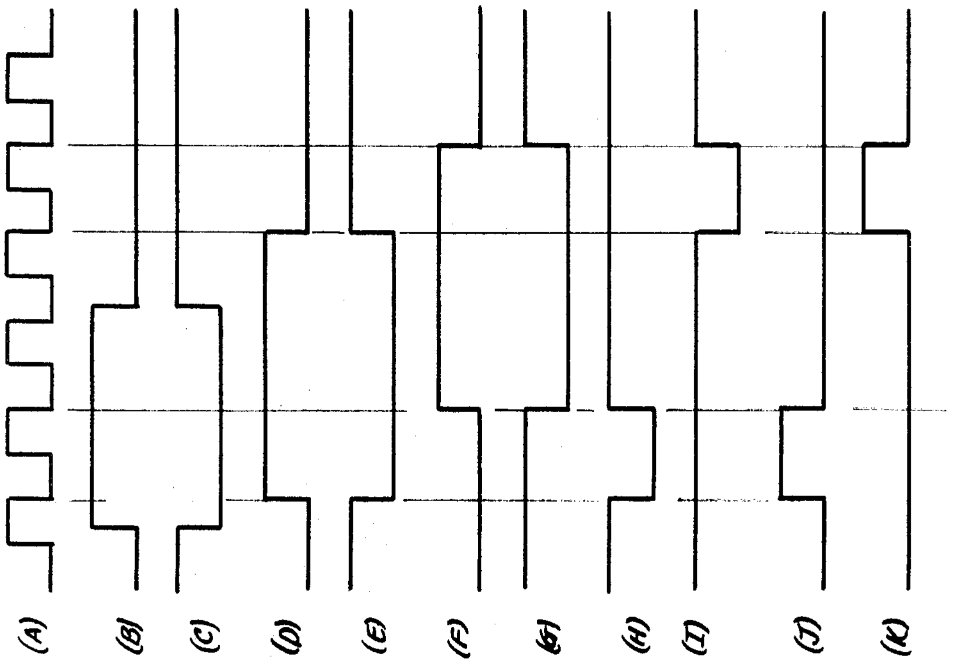
FIG. 7 is a graphical representation of idealized waveforms of the output signals from the various components incorporated in the species of the subject invention shown in FIG. 2.

The device of FIG. 2 operates in essentially the same manner as the device of FIG. 1, with the exception that the initiating signal may be an analog signal having a predetermined waveform. The timing diagram of this species is shown in FIGS. 7(A) through 7(K). If, for example, the signal of FIG. 7(B) is considered as being the analog signal supplied to input terminal 31 by an associated compatible equipment (not shown), it and its complement, produced by inverter 32, become the operative data signals. Then, the signal processing that occurs in the remainder of the device is straightforward and similar to that explained above with respect to FIG. 1, as may readily be seen from the graphical representation of the signal waveforms illustrated in FIG. 7. Since it is opined that it would be well within the purview of one skilled in the art having the benefit of the above teachings regarding FIG. 1 to follow through the signal processing and timing effected by the device of FIG. 2 and illustrated in FIG. 7, in order to simplify this disclosure, the operation of this device will not be belabored further.

Likewise, the operations effected by the systems of FIG. 3 should now be obvious to the artisan, as far as the devices of FIGS. 1 and 2 incorporated therein are concerned. Of course, as previously mentioned, selector switches 53 and 58 and utilization apparatus 60, 62, and 63 may be operated in any one of numerous combinations, in order to facilitate obtaining results desired during any given operational circumstances.

Figure 6:
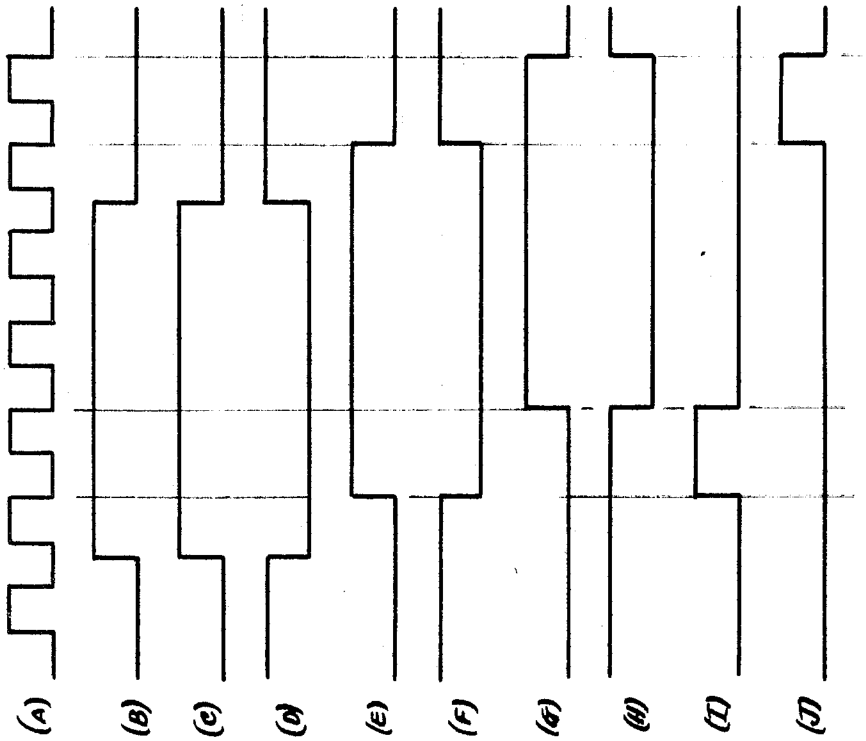
FIG. 6 is a graphical representation of the idealized waveforms of the signals which emanate from the outputs of the various components of the species of the invention shown in FIG. 1.

The bistable multivibrator of FIG. 4 and the NAND-gate circuit of FIG. 6 are both of straightforward and conventional design. They are disclosed herein merely for the purpose of showing the respective preferred types that may be incorporated in the subject invention to an advantage. Of course, they, too, function in well known and conventional manners.

At this time, it would appear to be noteworthy that all of the elements or components depicted in block or other forms in all of the figures of the drawing are well known and conventional per se. Therefore, it should be understood that it is their unique interconnections and interactions that effect the new combinations constituting this invention and causes it to produce the new and improved results not found in or not obtainable from the devices of the prior art.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A single pulse logical switching circuit comprising in combination:

means for supplying a single predetermined electrical signal;

means directly connected to said single predetermined electrical signal supplying means for producing a pair of data signals having substantially equal and oppositely configured waveforms in response to said single predetermined electrical signal;

means connected to the outputs of said data signal producing means for timely loading, storing, and unloading of said pair of data signals in response to predetermined clock pulses, said means consisting of a first bistable multivibrator having a trio of inputs and a pair of outputs, with a pair of the inputs thereof directly connected to the aforesaid data signal producing means for response to the pair of data signals produced thereby, respectively, and with the remaining input thereof adapted for response to said predetermined clock pulses, and a second bistable multivibrator having a trio of inputs and a pair of outputs, with a pair of inputs thereof respectively directly connected to the pair of outputs of said first bistable multivibrator, and with the remaining input thereof adapted for response to said predetermined clock pulses;

means connected to said data signal loading, storing, and unloading means for timely supplying of said clock pulses directly thereto, said means consisting of a clock pulse generator directly connected to the remaining inputs of the aforesaid first and second bistable multivibrators; and means directly connected to the outputs of said first and second bistable multivibrators of said data signals loading; storing, and unloading means for simultaneously gating predetermined data signals that are simultaneously stored therein and unloaded therefrom in such manner as to produce in timely succession a pair of similarly configured pulses of one clock period duration at the output thereof.

2. The device of claim 1 wherein said means for supplying a single predetermined electrical signal comprises:

a single-pole double-throw switch having an arm that is movable for alternate connection to a pair of electrical contacts; and a ground connected to said movable arm.

3. The device of claim 1 wherein said means for supplying a single predetermined electrical signal is an electrical input terminal.

4. The device of claim 1 wherein said means connected to said single predetermined electrical signal supplying means for producing a pair of data signals having substantially equal and oppositely configured waveforms in response to said single predetermined electrical signal comprises:

a first NAND gate having a pair of inputs and an output, with one of the inputs thereof connected to the aforesaid single predetermined electrical signal supply means; and a second NAND gate having a pair of inputs and an output, with one of the inputs thereof connected to the output of said first NAND gate, with the other input thereof connected to the aforesaid single predetermined electrical signal supplying means, and with the output thereof connected to the other input of the aforesaid first NAND gate.

5. The device of claim 1 wherein said means connected to said single predetermined electrical signal supplying means for producing a pair of data signals having substantially equal and oppositely configured waveforms comprises a flip-flop.

6. The device of claim 1 wherein said means connected to said single predetermined electrical signal supply means for producing a pair of data signals having substantially equal and oppositely configured waveforms comprises a complement signal generator having an input and a pair of outputs, with an inverter connected between said input and one of said outputs.

7. The device of claim 1 wherein said means connected to the outputs of said first and second bistable multivibrators of said data signals loading, storing, and unloading means for simultaneously gating predetermined data signals simultaneously stored therein and unloaded therefrom in such manner as to produce in timely succession a pair of similarly configured pulses of one clock period duration at the outputs thereof comprises a coincidence circuit.

8. The device of claim 1 wherein said means connected to the outputs of said first and second bistable multivibrators of said data signals loading, storing, and unloading means for simultaneously gating predetermined data signals simultaneously stored therein and unloaded therefrom in such manner as to produce in timely succession a pair of similarly configured pulses of one clock period duration at the outputs thereof comprises a pair of AND gates, each of which has a pair of inputs and an output, with the inputs of one thereof respectively connected to predetermined oppositely polarized outputs of said first and second bistable multivibrators, and with the inputs of the other thereof respectively connected to the remaining oppositely polarized outputs of the aforesaid first and second bistable multivibrators.

9. The device of claim 1 wherein said means connected to the outputs of said first and second bistable multivibrators of said data signals loading, storing, and unloading means for simultaneously gating predetermined data signals simultaneously stored therein and unloaded therefrom in such manner as to produce in timely succession a pair of similarly configured pulses of one clock period duration at the outputs thereof comprises:

a pair of NAND gates, each of which has a pair of inputs and an output, with the inputs of one thereof respectively connected to predetermined oppositely polarized outputs of said first and second bistable multivibrators, and with the inputs of the other thereof respectively connected to the remaining oppositely polarized outputs of the aforesaid first and second bistable multivibrators; and a pair of inverters respectively connected to the outputs of the aforesaid NAND gates.

10. A logical switching system for producing noise-free output pulses in response to noisy input pulses and clock pulses synchronized therewith in accordance with a predetermined timing program comprising in combination:

a switch signal source;

a cross-coupled NAND-gates circuit connected to the output of said switch signal source;

an analog input signal source;

a complement signal generator connected to the output of said analog input signal source;

a first selector switch having a pair of inputs and an output, with one of the inputs thereof connected to the output of said cross-coupled NAND-gates circuit, and with the other input thereof connected to the output of said complement signal generator;

a shift register having a data signal input, a shift pulse input, and an output, with the data signal input thereof connected to the output of said first selector switch;

a clock pulse generator connected to the shift input of said shift register;

a second selector switch having an input and a pair of outputs, with the input thereof connected to the output of said shift register;

a coincidence AND-gates circuit connected to one of the outputs of said selector switch;

an AND-gates circuit connected to the other input of said selector switch;

a first utilization apparatus connected to one of the outputs of said coincidence AND-gates circuit;

a second utilization apparatus connected to one of the outputs of said AND-gates circuit; and a third utilization apparatus connected to the other outputs of said coincidence AND-gates circuit and said AND-gates circuit.

* * * * *